Feb. 27, 1973   J. J. PLOMER ET AL   3,718,069

MIXER-MOLDER

Filed Jan. 28, 1966

INVENTORS.
John J. Plomer
Hazen V. Doan
Thomas E. Slykhouse
BY C. Kenneth Bjork
AGENT United States Patent Office 3,718,069
Patented Feb. 27, 1973

3,718,069
MIXER-MOLDER
John J. Plomer, Midland, Hazen V. Doan, Auburn, and Thomas E. Slykhouse, Midland, Mich., assignors to The Dow Chemical Company, Midland, Mich.
Filed Jan. 28, 1966, Ser. No. 524,375
Int. Cl. C06d 1/08
U.S. Cl. 86—20 D  3 Claims

ABSTRACT OF THE DISCLOSURE

The invention is a mixer-molder unit particularly suitable for use in the blending and in situ forming of solid propellant grains. Power supply, drive means and mix component supply means are exterior to the unit. The mixing container inside of the unit can be the actual motor case for holding a propellant grain.

---

The present invention relates to mixing and molding and more particularly is concerned with a novel mixer-molder particularly suitable for use in the blending and molding of solid propellant grains.

In the preparation and fabrication of solid propellant grains, various components employed in the grain may be somewhat dangerous to handle in that they are shock or heat sensitive. Also, mix components of the grain itself can be detrimentally attacked and/or otherwise degraded by improper handling, excessive transfer or movement during processing or by contact with the atmosphere. Further each separate step in processing can lead to loss of the propellant or its components.

It is a principal object of the present invention to provide a novel mixer-molder system and method of its operation which provides for remote transfer, handling and mixing of components and propellant grain molding under predetermined processing conditions of heat, pressure and atmosphere.

It is also an object of the present invention to provide a novel mixer which substantially eliminates propellant losses as occur during normal propellant blending, casting and transfer operations.

It is a further object of the present invention to provide a single unit for mix component blending and grain molding where these operations take place in the propellant motor casing itself.

It is another object of the present invention to provide a mixer which readily fits into an integrated system utilizing remote operation and control for propellant grain blending, molding, trimming, inhibiting and curing as well as for transferring the propellant grain to and locking the grain into a test firing stand with a minimum of operating steps.

These and other objects and advantages readily will become apparent from the detailed description presented hereinafter when read in conjunction with the drawing.

Figure 1:
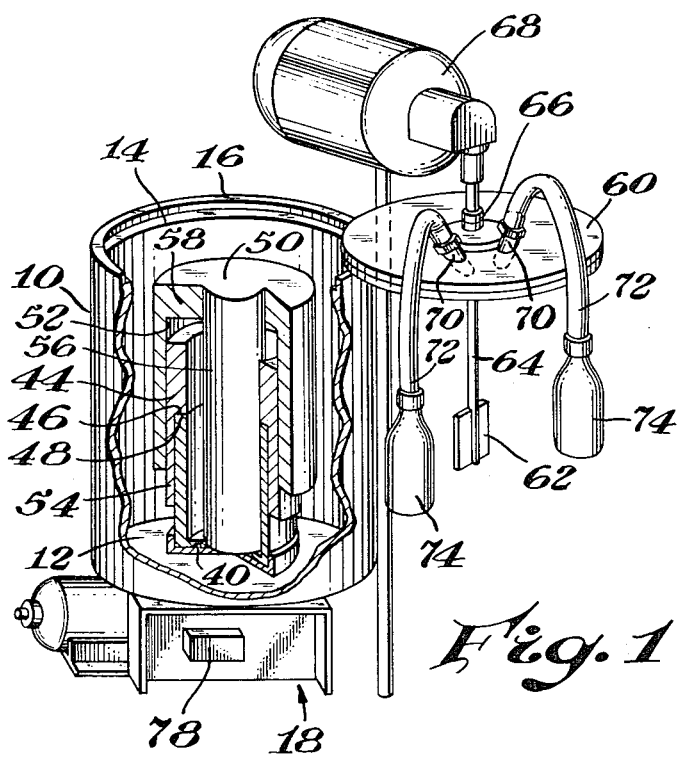
FIG. 1 is an isometric view, partly in section, of a preferred embodiment of the mixer of the present invention showing various mixer components employed in the preparation of an internal burning grain.
Figure 3:
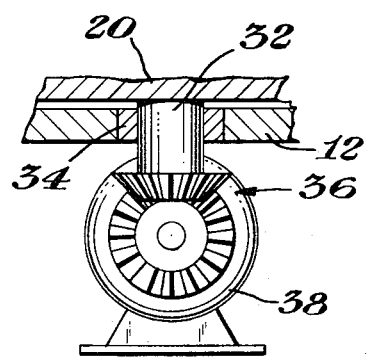
FIG. 3 is a fragmentary enlarged sectional view of FIG. 2.
Figure 2:
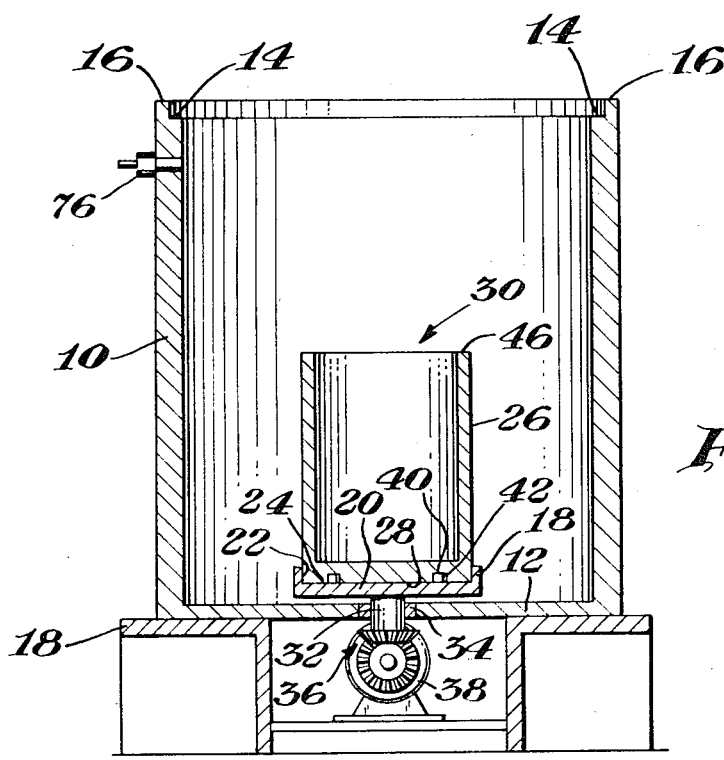
FIG. 2 is a vertical section view of the basic mixer unit showing the mixer components employed in preparing an end burning propellant grain.

The mixer-molder unit of the present invention comprises an outer vessel having a removable cover and a power driven rotatable holder positioned therein. This rotatable unit ordinarily is positioned near the bottom of the outer vessel and holds a mixing container, e.g. motor case of a propellant grain, in which the actual blending and mixing of materials takes place. A mixing unit is positioned such that its agitator or mixing blade extends through the cover of the outer vessel and is within the mixing container. Ordinarily, for optimum efficiency in blending, the mixing container and agitator are rotated countercurrently to each other. Mix component supply means, e.g. reservoirs and conduits, for storage of mix components and introduction of these into the mixing chamber, are attached to the removable cover. These are positioned in the cover to assure that the mix components are introduced through the cover and fed into the mixing chamber during operation. Conveniently, for the optimum in safety during propellant grain formulation and molding, the entire assembly is operable by remotely controlled manipulative units such as mechanical arms and the like.

One preferred embodiment of the mixer-molder of the present invention as shown in the figures of the drawing comprises an outer tank 10, usually cylindrical in shape, having a fixed bottom 12 and a shoulder 14 in its open top edge 16. The tank 10 is maintained on a supporting base 18.

The propellant motor case holder 20 is positioned near the bottom 12 of tank 10 being substantially centered therein and substantially parallel to the bottom 12 of this tank 10. The inner wall 22 and inner bottom surface 24 of motor case holder 20 usually is of the same general configuration as the outer wall 26 and outer bottom surface 28 of propellant motor case 30. The propellant motor case holder 20 is designed to rotate within tank 10. In the depicted embodiment, a shaft 32 which passes through a pressure tight seal-bearing 34 in the bottom 12 of tank 10 connects the propellant motor case holder 20 and a bevel gear assembly 36. The gear assembly 36 in turn is driven by an electric motor 38. It is to be understood that other driving means and rotatable mechanical assemblies such as pulleys and belts, sprockets and chains, universal joints, worm gear or other gear assemblies and the like can be used to rotate the motor case holder 20.

The motor case holder 20 also is fitted with frictional engagng means such as a clamping assembly or other restraining means which hold the motor case 30 in a fixed position when positioned in the holder 20 thereby assuring that the motor case 30 rotates as the motor case holder 20 is rotated. In the depicted embodiment, the motor case 30 is held in a fixed position in the holder 20 by means of pins extending upward from the bottom surface 24 of motor holder case 20. These pins 40 mate with indentations 42 in the outer bottom surface 28 of the motor case 30.

Ordinarily, as shown in the depicted embodiment, the motor case holder 20 and motor case 30 are cylindrical. However, it is to be understood that these can be of any predetermined configuration as is desired in a propellant grain. In the embodiment described hereinbefore, the motor case 30 provides a cylindrical solid propellant grain such as is used in a so-called "end burning" motor. In the preparation of "internal burning" grains, an extension sleeve 44 is positioned onto the open top 46 of motor case 30. Conveniently, as shown, the sleeve 44 has a wall thickness greater than that of the motor case 30 and contains a recessed shoulder 48 extending a portion of the way along its length. This recessed shoulder 48 is designed to provide a smooth continuous inner wall surface along the entire length of the motor case 30 and sleeve 44. The recessed shoulder 48 is positioned at a predetermined distance along the length of extension sleeve 44 so as to give a grain of predetermined overall length. Further a mandrel 50, the inner wall surface 52 of which mates with the outer wall surface 54 of sleeve 44 and provides a sliding engagement therewith, is also provided for the fabrication of the internal burning grains. This mandrel 50 has a center post 56 extending inside the mandrel from a closed top surface 58. The center post 56 can be cylindrical, star shaped or of any other design as is employed in forming the internal opening configuration of an internal burning propellant grain.

The overall length of tank 10 is such to accommodate the motor case 30, extension 44 and mandrel 50 if such are employed. Tank 10 is fitted with a removable cover 60 which fits tightly in the shoulder 14. Conveniently, this cover is made from a transparent high strength material, e.g. Plexiglas acrylic resin or safety glass, which permits visual observation of the propellant grain during the various stages of its fabrication in the mixer-molder unit. Cover 60 is fitted with an agitator assembly 62 positioned therein such that its stirring member is within the motor case during the propellant mixing operation. Agitator shaft 64 passes through a pressure tight seal-bearing 66 in top member 60 and in turn is connected to a power driving means 68, for example, an electric motor driven gear assembly. During operation of the mixer of the present invention, agitator 62 usually is rotated in a direction opposite to that of motor case holder 20 to provide for optimum of mixing and blending in the shortest period.

Connections 70 also are fitted into cover 60 defining passages therethrough. Each connection 70 is fitted with a delivery conduit 72 and a reservoir 74 for holding and delivering mix components. As shown in the depicted embodiment, two such delivery systems, i.e. reservoir 74, delivery conduit 72 and connector 70 are fitted into the top 60. Depending upon the complexity of the mixing operation and the number of components desired to be mixed more of such assemblies can be fitted into cover 60.

Further, other connectors such as are employed for connection to a pump or other pressure reducing means for drawing a reduced pressure on the system as well as for connecting to a pressure source for backfilling with air or other inert atmospheres can be incorporated either into the cover 60 or the tank 10. One such connector 76 used to reduce the internal pressure on the system during mixing as well as to deaerate after blending and provide an inert atmosphere during subsequent operations and propellant cure is shown near the top 16 of the side wall of tank 10.

Additionally, the tank 10 can be fitted with a permanent or removable heating mantle (not shown). Alternatively, the tank can be wound with a resistance heating tape or the entire assembly heated by means of an external heat source such as infrared lamps. Similarly, a steam coil can be wrapped around the tank 10.

A vibrator 78 also can be affixed to the supporting frame 18, tank 10 or motor case holder 20, if desired. This provides for compaction of the mix components after blending and assures substantially complete elimination of gas bubbles, air gaps and other void spaces which are undesirable in a propellant grain.

The following illustration demonstrates the design and operability of one embodiment of the present novel mixing and propellant grain molding apparatus and its use in fabricating a solid propellant grain.

A motor case about 2 inches in diameter and about 3 inches long was fabricated from a stainless steel pipe. A bottom was welded to one end and a removable cover fitted to the other end. Reservoir bulbs for storage of solid components and Tygon vinyl delivery tubes for feeding propellant components into the mixer also were provided. All of these parts were dried and placed in a dry box having a substantially anhydrous inert atmosphere. Fuel and oxidizer components were loaded into the glass reservoir bulbs while in the dry box and all units then transferred from the dry box to the mixer assembly. Each feed bulb was connected through its Tygon vinyl tube conduit to a fitting in the top of the mixer. The motor case was placed in the mixer tank and fastened by means of mating pins and indentations into the rotatable motor case holder in the bottom of the tank. The removable top was removed from the motor case and a predetermined amount of a liquid binder placed in the motor. (If desired, the binder can be placed in the motor case while in the dry box prior to its positioning in the mixer.) The mixer cover to which had been connected the solids delivery tubes and which also held a paddle-blade mixer was placed in position and fitted tightly to the outer tank of the mixer. Upon assembly, the position of the delivery tubes assured that the solid components were introduced into the motor. Also, the blade of the mixer was positioned within the motor case.

Periodic addition of the fuel and oxidizer components were made into the motor case while continually rotating the paddle mixer in one direction and the motor case in the opposite direction. (These additions were carried out by remotely raising and lowering the bulbs whereby the solids were gravity fed into the motor case.) This assured uniform and rapid blending of the mix components. Following the mixing the system was deaerated by reducing the pressure on the system. The pressure then was relieved and an inert atmosphere, e.g. substantially anhydrous nitrogen, introduced into the tank after which the paddle mixer was removed from the case.

For an end burning grain ordinarily the side walls of the case are scraped down after the mixing. After this, the resulting blend ordinarily is vibrated to assure compaction of the particles into a dense mass.

An insulated cover was placed over the top of the mixer tank and the grain cured at a predetermined temperature by heat supplied to the system from the heating mantle surrounding the outer tank of the mixer. As indicated hereinbefore, other heat sources can be used. After curing, the motor was removed from the mixer. The grain can be stored or taken directly to other stations or locations for trimming, weighing, inhibiting test firing and the like operations.

For preparing internal burning grains, an extension sleeve is placed onto the top of the motor case prior to positioning of the top mixing unit. After the addition of the mix components and blending of these has been completed, a mandrel having a configuration corresponding to the desired internal cavity of the grain is forced down into the mix. This forces excess propellant up the sides of the case and forms the center opening of the internal burning grain.

A prime advantage of the present invention is that all operations ordinarily are carried out by remote control using mechanical arms, shields and the like handling, manipulative and safety equipment as generally employed in the propellant art for processing high energy materials. In fact, assembly of the apparatus, material transfers, disassembly after curing, removal of the grain from the mixer after curing and transfer of the grain to other locations for trimming, weighing, testing and other operations all readily can be carried out by remote control.

The following examples showing the preparation of aluminum hydride-ammonium perchlorate-nitrosol double base solid propellants following the technique and using the mixer-molder described directly hereinbefore further illustrates the operability of the mixer of the present invention but is not meant to be limiting of the invention.

EXAMPLE 1

While in a dry box, about 50 grams of a liquid, plasticized nitrocellulose binder (25 parts by weight of a plastisol grade nitrocellulose, 40 parts by weight diethyleneglycol dinitrate and 35 parts by weight trimethylolethane trinitrate) was placed in a dry 2 inch by 3 inch rocket motor case and a removable top placed on the case. About 29 grams of a substantially non-solvated hexagonal crystalline aluminum hydride was introduced into one of the glass reservoir bulbs and about 21 grams ammonium perchlorate placed into the other glass feed bulb. One end of a Tygon vinyl tube was fitted to the top of each of the reservoir bulbs.

The so-loaded components of the mixer unit were removed from the dry box, the motor case being positioned onto and held in place by the pins of a rotating motor case holder in the mixer tank. The other end of each of the Tygon vinyl tubes was connected to a fitting in the Plexiglas cast acrylic resin top for the mixer tank. The cover was removed from the motor case by remote operation and the top member of the tank, fitted with a paddle blade mixer, was put in place also by remote manipulation. During this operation, a nitrogen atmosphere was maintained in the system. After positioning, the paddle blade of the mixer was within the motor case and made contact with the plastisol binder. When all of the mixer components were in place, the nitrogen flow was stopped and a reduced pressure drawn on the system. This served to draw the cover of the tank into place and seat it firmly and tightly into the recess on the top edge of the outer tank member.

The rotating motor case holder was activated and the mixer started. These provided counter rotating movements. The aluminum hydride fuel containing and ammonium perchlorate oxidizer containing glass reservoir bulbs periodically were raised and lowered by a remotely controlled mechanized arm thereby introducing portions of the solid materials into the motor case.

After all the fuel and oxidizer components had been introduced into the motor case, mixing was continued until a substantially homogeneous blend was obtained. The system was deaerated by temporarily reducing the pressure therein. This pressure was relieved, a nitrogen flow started and the top of the mixing tank was removed. The side wall of the motor case was scraped down by remote control using the mechanical arm and a scraper. The system was vibrated to compact the blended mass after which time an insulated cover was placed over the top of the mixer tank and a heating mantle placed around the outside of the tank. The system was heated to a temperature of about 50° C. for a period of about 16 hours to cure the propellant grain.

After curing, the unit was disassembled by remote action using the mechanical arm. The cured grain was taken to other stations for trimming, weighing, inhibiting and test firing.

This end burning grain upon test firing exhibited good smooth burning rates indicative of a dense substantially void-free grain.

EXAMPLE 2

Following the same general procedure as described in Example 1, the mixer unit was used to prepare an internal burning grain. For this study, about 50 grams of the binder described in Example 1, 20 grams of a substantially anhydrous, hexagonal aluminum hydride and 30 grams ammonium perchlorate were introduced into and blended in a 2 inch by 3 inch motor case. The only step used in this stage of operation different from Example 1 was the placing of an extension sleeve on top of motor case prior to introducing the mix components therein.

Following the mixing operation and prior to compaction, a mandrel was forced, by remotely controlled operation, down into the mix forcing propellant up the side of the case and providing the desired internal void configuration in the grain.

The propellant was cured and post-treated following the technique described in Example 1.

This grain upon test firing also burned smoothly indicating proper blending of the mix components and a substantially void free propellant.

It will be apparent to one skilled in the art that solid propellant grains of other compositions readily can be blended and molded using the novel mixer-molder of the present invention. Further various modifications of the present invention can be made without departing from the spirit or scope thereof for it is understood that we limit ourselves only as defined in the appended claims.

We claim:

1. A mixer-molder unit comprising: an outer vessel having a removable cover, a rotatable holder positioned in said vessel near the bottom of said outer vessel, a mixing container, said mixing container being a motor case for a propellant grain, said motor case being cylindrical in shape and including a removable extension sleeve and a mandrel, said removable extension sleeve positioned onto the top of said motor case and mating with the outer wall surface of said extension sleeve and providing a sliding engagement therewith, said rotatable holder holding said mixing container, a mixing unit, said mixing unit having an agitator and positioned such that said agitator extends through the cover of said outer vessel and during a mixing operation is within the mixing container, said rotatable holder and said mixing container therein and the agitator of said mixing unit during operation rotating countercurrently to each other, and mix component supply means attached to the removable cover, said mix component supply means positioned such that mixing components are introduced therefrom through said cover and into said mixing container.

2. A mixer-molder unit for fabricating propellant grains which comprises: an outer tank, said tank having a fixed bottom and a shoulder in its open top edge, a power driven rotatable propellant motor case holder and propellant motor case, the inner wall and inner bottom surface of said motor case holder being of the same general configuration as the outer wall and outer bottom surface of said propellant motor case, said propellant motor case holder being substantially centered near the bottom of said tank and substantially parallel thereto, said motor case fitted into said holder and restrained therein in a fixed position but removable therefrom thereby assuring that said motor case rotates as said motor case holder is rotated during operation, a cover for said tank, said cover being removable and fitting tightly in the shoulder in the open top edge of said tank, said cover being fitted with an agitator assembly having a stirring member, said agitator assembly being positioned such that the stirring member of said agitator assembly is within said motor case during operation, connections fitted into said cover of said tank and defining passages through said cover, each of said connections being fitted with a delivery conduit and a reservoir, said connections and passages in said cover being positioned to assure that materials from said reservoir are delivered into said motor case during a mixing operation.

3. The mixer-molder as defined in claim 2 and having a removable extension sleeve and a mandrel, said extension sleeve being positioned onto the top of said motor case, said mandrel having a center post extending inside said mandrel from its closed top surface, said mandrel fitted into said extension sleeve, the inner wall surface of said mandrel mating with the outer wall surface of said extension sleeve and providing sliding engagement therewith.

References Cited

UNITED STATES PATENTS

| 2,755,073 | 7/1956 | Woyth et al. | 259—82 |
| 3,107,574 | 10/1963 | Mebane | 86—20 |
| 3,115,821 | 12/1963 | Hubner | 259—85 |

VERLIN R. PENDEGRASS, Primary Examiner

U.S. Cl. X.R.

259—82